US009399409B2

(12) United States Patent
Rdzanek et al.

(10) Patent No.: US 9,399,409 B2
(45) Date of Patent: Jul. 26, 2016

(54) EASY-ENTRY VEHICLE SEAT WITH COVER ASSEMBLY

(71) Applicant: Faurecia Automotive Seating, LLC, Troy, MI (US)

(72) Inventors: Emil Rdzanek, Jozefoslaw (PL); Meinhard Behrens, Obernkirchen (DE); Martin Graeper, Hannover (DE)

(73) Assignee: Faurecia Automotive Seating, LLC, Troy, MI (US)

( * ) Notice: Subject to any disclaimer, the term of this patent is extended or adjusted under 35 U.S.C. 154(b) by 498 days.

(21) Appl. No.: 13/763,340

(22) Filed: Feb. 8, 2013

(65) Prior Publication Data

US 2013/0200673 A1  Aug. 8, 2013

Related U.S. Application Data (60) Provisional application No. 61/596,637, filed on Feb. 8, 2012.

(51) Int. Cl.
| | |
|---|---|
| *A47C 7/02* | (2006.01) |
| *B60N 2/02* | (2006.01) |
| *B60N 2/12* | (2006.01) |
| *B60N 2/20* | (2006.01) |

(52) U.S. Cl.
CPC .. *B60N 2/02* (2013.01); *B60N 2/12* (2013.01); *B60N 2/20* (2013.01); *B60N 2205/30* (2013.01)

(58) Field of Classification Search
CPC ..................................... B60N 2/12; B60N 2/20
USPC ..................... 297/341, 378.1, 378.12, 452.38
See application file for complete search history.

(56) References Cited

U.S. PATENT DOCUMENTS

| | | | | | |
|---|---|---|---|---|---|
| 2,926,950 | A | * | 3/1960 | Hooverson | B60N 2/3031 296/66 |
| 4,167,288 | A | * | 9/1979 | Kiang | A47C 1/032 297/317 |
| 4,909,572 | A | * | 3/1990 | Kanai | B60N 2/6009 297/452.38 |
| 5,464,273 | A | * | 11/1995 | Makoto | B60N 2/242 297/232 |
| 6,149,241 | A | * | 11/2000 | Waku | B60N 2/015 297/452.38 |
| 6,805,406 | B1 | * | 10/2004 | Jansen | A61G 5/1064 280/304.1 |
| 7,237,846 | B1 | * | 7/2007 | Arima | B60N 2/6009 297/452.18 |
| 7,651,166 | B2 | * | 1/2010 | Schwingenschlogel | B60N 2/06 297/334 |

* cited by examiner

*Primary Examiner* — Matthew Ing
(74) *Attorney, Agent, or Firm* — Reising Ethington P.C.

(57) ABSTRACT

A passenger support apparatus includes a vehicle seat equipped with an easy-entry unit configured to provide easier passenger ingress and egress to an area behind the vehicle seat. The vehicle seat includes a seat bottom with front and rear portions and a seat back extending from the seat bottom. The easy-entry unit includes the seat back and the rear portion of the seat bottom and pivots about a pivot axis between an occupant use position and an access position. A cover assembly is coupled to the vehicle seat and expands and retracts between a stored configuration and a deployed configuration to limit access to an underside of the seat bottom whether the easy-entry unit is in the occupant use position, the access position, or an intermediate position. The vehicle seat can also be configured to slide along a seat support frame between forward and rearward positions.

18 Claims, 6 Drawing Sheets

EASY-ENTRY VEHICLE SEAT WITH COVER ASSEMBLY

This application claims the benefit of U.S. Provisional Patent Application No. 61/596,637 filed Feb. 8, 2012, the entire contents of which are hereby incorporated by reference.

TECHNICAL FIELD

The present disclosure relates generally to vehicle seats and, more particularly, to vehicle seats configured to change position and/or location to provide access to areas of the vehicle behind the vehicle seats.

BACKGROUND

Vehicle seats are sometimes configured to move and/or otherwise change position to allow for easier access to other areas of the vehicle cabin, such as to other vehicle seats or seating areas located behind the moveable seat. For example, a front vehicle seat may have a seat back that tilts forward to allow a passenger to enter or exit a rear vehicle seat or seating area behind the front seat. In another example, a vehicle seat may be configured to fold so that the seat back does not obstruct access to the desired area. However, in some types of vehicles, tilting seat backs or folding components are not enough on their own to provide adequate access to and/or from the area behind a vehicle seat.

SUMMARY

In accordance with one embodiment, a passenger support apparatus includes a seat-support frame and a vehicle seat coupled to and overlying the seat-support frame. The vehicle seat includes a seat bottom and a seat back extending from the seat bottom. The seat bottom has a front portion and a rear portion pivotally coupled with the front portion for rotation about a pivot axis. The passenger support apparatus also includes a cover assembly coupled to the seat bottom that limits access to an underside of the seat bottom. The seat back and the rear portion of the seat bottom cooperate to form an easy-entry unit that pivots about the pivot axis between an occupant use position and an access position.

In one or more other embodiments, the cover assembly changes from a stored configuration to a deployed configuration in response to movement of the easy-entry unit from the occupant use position to the access position. The cover assembly covers at least a portion of the underside of the seat bottom when in the deployed position.

In one or more other embodiments, the cover assembly includes a shield guide coupled to the seat bottom and a shield movable along a path at least partially defined by the shield guide.

In one or more other embodiments, the cover assembly includes a shield driver coupled to the shield and configured to drive the shield along said path in response to movement of the easy-entry unit from the occupant use position to the access position.

In one or more other embodiments, the shield driver includes a drive rod, a slide coupler pivotally coupled to the drive rod, and a pivot link extending between the slide coupler and the shield.

In one or more other embodiments, the pivot link is: pivotally coupled to the seat-support frame, slidably coupled to the shield, slidably coupled to the slide coupler, or any combination thereof.

In one or more other embodiments, the cover assembly includes an inner shield plate and an outer shield plate in sliding arrangement with each other, so that at least a portion of the inner shield plate slides out from beneath the outer shield plate when the easy-entry unit is moved from the occupant use position to the access position.

In one or more other embodiments, the seat back is pivotally coupled with the rear portion of the seat bottom for rotation about a second pivot axis.

In accordance with another embodiment, a method for reconfiguring a passenger support apparatus includes the steps of: (a) pivoting an easy-entry unit of a vehicle seat about an axis from an occupant use position to an access position, and (b) sliding the vehicle seat from a rearward position to a forward position along a seat-support frame. The easy-entry unit includes a seat back and a rear portion of a seat bottom of the vehicle seat.

In one or more other embodiments, the method further includes the step of changing a cover assembly from a stored configuration to a deployed configuration during step (a). The cover assembly is coupled to the rear portion of the seat bottom and limits access to an underside of the seat bottom.

In one or more other embodiments, the method further includes the step of sliding inner and outer plates of the cover assembly relative to each other so that the cover assembly expands to cover a larger portion of the easy-entry unit in the deployed configuration than in the stored configuration.

In one or more other embodiments, the cover assembly extends to cover at least a portion of the underside of the seat bottom when in the deployed configuration.

In one or more other embodiments, the method further includes the step of activating an easy-entry motion controller that allows pivotal movement of the easy-entry unit about said axis.

In one or more other embodiments, the method further includes the step of activating a seat-motion controller that allows the vehicle seat to slide along the seat-support frame.

In one or more other embodiments, the method further includes the step of deactivating the seat-motion controller after step (b) so that the vehicle seat is not allowed to slide along the seat-support frame while the easy-entry unit is in the access position and the vehicle seat is in the forward position.

Various aspects, embodiments, examples, features and alternatives set forth in the preceding paragraphs, in the claims, and/or in the following description and drawings may be taken independently or in any combination thereof. For example, features disclosed in connection with one embodiment are applicable to all embodiments, except where there is incompatibility of features.

DESCRIPTION OF THE DRAWINGS

One or more preferred exemplary embodiments will hereinafter be described in conjunction with the appended drawings, wherein like designations denote like elements, and wherein.

DETAILED DESCRIPTION OF ILLUSTRATIVE EMBODIMENT(S)

As will become apparent from the following disclosure, a passenger support apparatus including a vehicle seat equipped with an easy-entry unit can be used to provide easier passenger ingress and egress to an area behind the vehicle seat, such as an additional seating area. The vehicle seat may include a seat bottom and a seat back extending from the seat bottom, and a portion of the seat bottom may be configured to pivot along with the seat back as part of the easy-entry unit. The vehicle seat may also be configured to slide along a seat-support frame to allow even easier passenger access to the area behind the vehicle seat. A cover assembly may be provided along the seat bottom to limit access to an underside of the seat bottom, such as by the feet of a passenger seated behind the vehicle seat. The cover assembly may be configured to limit said access even when the portion of the seat bottom pivots away from the seat-support frame. While described below in the context of a second row vehicle seat so that the easy-entry unit provides easier passenger access to and from a third row seat, the passenger support apparatus described below may be used with any vehicle seat to facilitate easier access to the area behind the vehicle seat.

Figure 1:
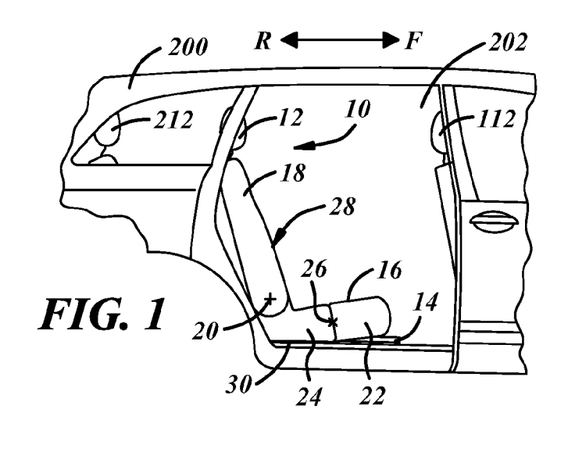
FIG. 1 is a side view of an embodiment of a passenger support apparatus, including a vehicle seat equipped with an easy-entry unit shown in an occupant use position.

With reference to FIG. 1, one example of a passenger support apparatus 10 is illustrated. The passenger support apparatus 10 is mounted in a vehicle 200 and is shown as viewed through a rear, side entry port 202 of the vehicle. The double arrow indicates the direction of the front (F) of the vehicle 200 and the rear (R) of the vehicle. The passenger support apparatus 10 includes a vehicle seat 12 (in this case a second row seat) supported by and overlying a seat support frame 14. The particular vehicle 200 shown in FIG. 1 also supports a first row seat 112 arranged in front of the second row seat 12, as well as a third row seat 212 arranged behind the second row seat. The vehicle seat 12 is moveable or changeable between an occupant use position and an access position as described below. The vehicle seat 12 may also be configured to be moveable or changeable between a forward and a rearward position.

The illustrated vehicle seat 12 includes a seat bottom 16 coupled with the seat support frame 14, as well as a seat back 18 extending from and pivotally coupled with the seat bottom for pivotal movement about a pivot axis 20. The vehicle seat 12 is shown in the occupant use position in FIG. 1, meaning that the seat back 18 is oriented so that it extends generally upward from the seat bottom 16 to support the back of a passenger or occupant seated on the seat bottom 16. The angle of incline of the seat back 18 relative to the seat bottom 16 may be user-adjustable. While in the occupant use position, the angle of the seat bottom with respect to the seat support frame 14 is generally fixed, though this angle may also be user-adjustable. The vehicle seat 12 of FIG. 1 is also shown in the rearward position, which is any position toward the rear of the vehicle with respect to the forward-most position of the vehicle seat along the support frame 14.

In the illustrated example, the seat bottom 16 includes a front portion 22 and a rear portion 24. The front and rear portions 22, 24 are pivotally coupled with each other for relative rotation about another pivot axis 26. The seat back 18 and the rear portion 24 of the seat bottom 16 cooperate to form an easy-entry unit 28. The easy-entry unit 28 is configured to pivot about the pivot axis 26 when the rear portion 24 of the seat bottom 16 is disengaged from the seat support frame 14. The easy-entry unit 26 is also said to be in the occupant use position in FIG. 1 and is moveable between the occupant use position and the access position as described below. When in the occupant use position, the front and rear portions 22, 24 of the seat bottom 16 are oriented with respect to each other so that the seat bottom forms a generally flat seating surface and so that an underside 30 of the rear portion 24 faces toward the seat support frame 14 or vehicle floor.

Figure 2:
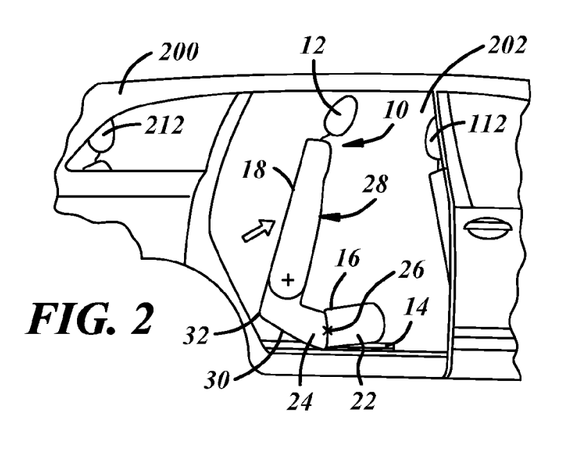
FIG. 2 is a side view of the passenger support apparatus of FIG. 1, showing the easy-entry unit in an intermediate position between the occupant use position and an access position.

FIG. 2 shows the easy-entry unit 28 in an intermediate position, which is a position between the occupant use position and the access position. In particular, the rear portion 24 of the seat bottom 16 is disengaged from the seat support frame 14 so that the easy-entry unit 28 is titled forward with respect to the occupant use position shown in FIG. 1. To move from the occupant use position to the intermediate position, the rear portion 24 of the seat bottom 16 pivots about the pivot axis 26, with a rear end 32 of the rear portion 24 pivoting away from the seat support frame 14 and the seat back 18 moving therewith. The front portion 22 of the seat bottom 16 remains coupled with the seat support frame as the easy-entry unit 28 pivots about the pivot axis 26. There may be an infinite number of intermediate positions between the occupant use position and the access position.

Figure 3:
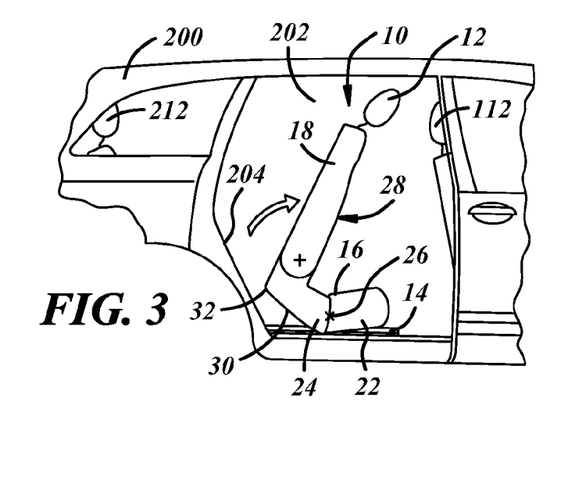
FIG. 3 is a side view of the passenger support apparatus of FIG. 1, showing the easy-entry unit in the access position.

FIG. 3 shows the vehicle seat 12 with the easy-entry unit 28 further pivoted about pivot axis 26 to the access position. In the access position, the position of the vehicle seat 12 with respect to the entry port 202 of the vehicle 200 is such that more space is available between the seat and a rear edge 204 of the entry port for easier passenger access to and from the area behind the vehicle seat 12—which in this case means easier passenger access to and from the illustrated third row seat 212 and more space between the second row seat and the third row seat.

Figure 4:
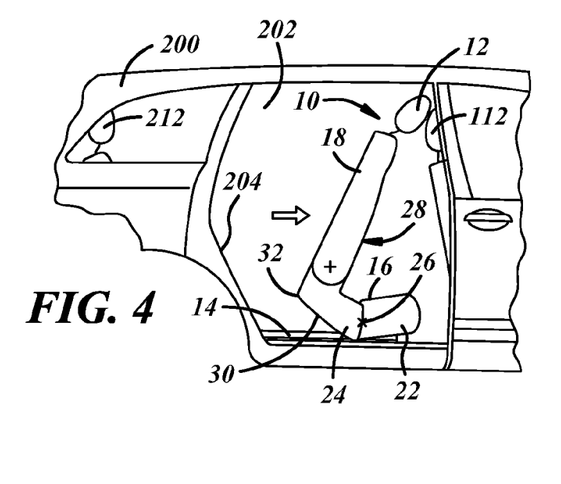
FIG. 4 is a side view of the passenger support apparatus of FIG. 1, showing the easy-entry unit in the access position and the vehicle seat in a forward position.

FIG. 4 shows the vehicle seat 12 with the easy-entry unit 28 in the access position and with the vehicle seat in the forward position. In this embodiment, the seat bottom 16—in particular, the front portion 22 of the seat bottom—is slidably coupled with the seat support frame 14 so that the vehicle seat 12 can slide along the support frame between the rearward position of FIGS. 1-3 and the forward position of FIG. 4. The easy-entry unit 28 is in the access position in both of FIGS. 3 and 4. With the vehicle seat 12 in the forward position of FIG. 4, even more space is provided between the vehicle seat and the edge 204 of the entry port 202. Enhancing access to the area behind the vehicle seat 12 need not always include movement of the vehicle seat toward the front of the vehicle 200, however. For example, the vehicle seat 12 may already be in its forward-most position when the easy-entry unit 28 is changed from the occupant use position to the access position so that no further forward movement of the seat is available. Or the vehicle seat 12 may not be moveable in the fore-and-aft directions.

Figure 5:
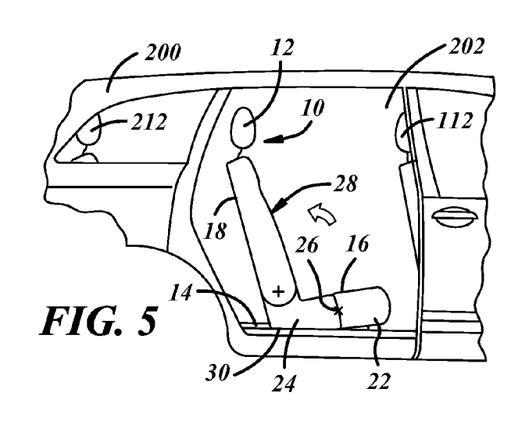
FIG. 5 is a side view of the passenger support apparatus of FIG. 1, showing the easy-entry unit in the occupant use position and the vehicle seat in the forward position.
Figure 6:
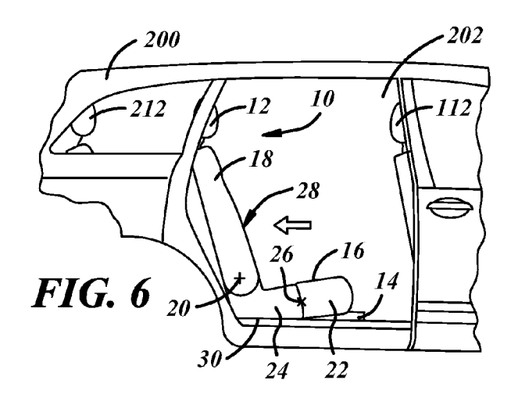
FIG. 6 is a side view of the passenger support apparatus of FIG. 1, showing the vehicle seat returned to the rearward position of FIG. 1.

From the access position of FIG. 4, the easy-entry unit 28 may be returned to the occupant use position by pivotal movement of the easy-entry unit about the pivot axis 26 such that the rear portion 24 of the seat bottom 16 moves toward the seat support frame 14, as shown in FIG. 5. From this position, where the rear portion 24 of the seat bottom 16 may engage the seat support frame 14, the vehicle seat 12 may be moved to the rearward position of FIG. 1 via sliding movement along the seat support frame, as indicated in FIG. 6.

Figure 7:
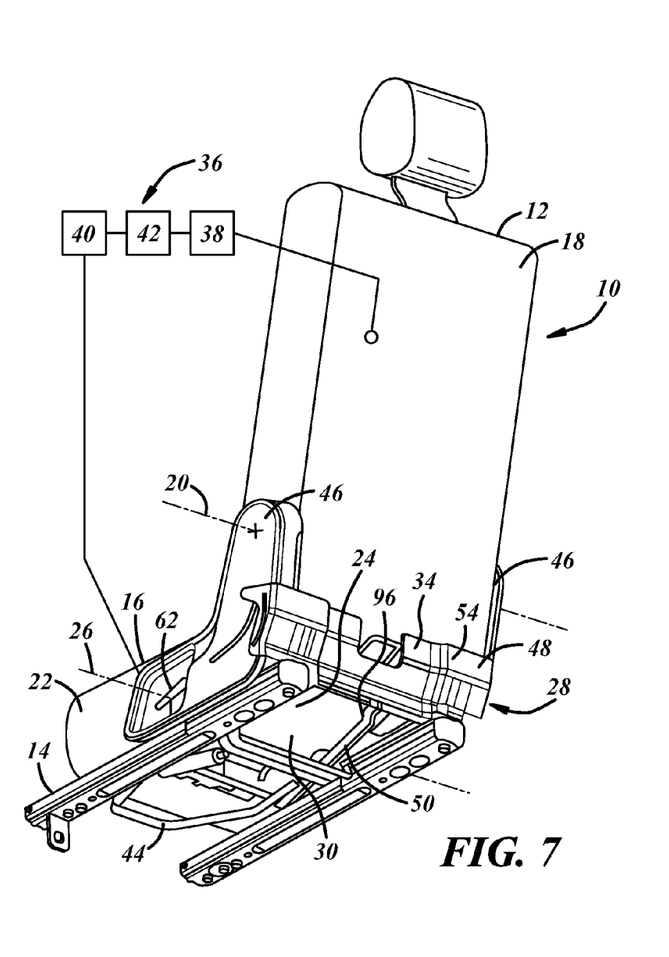
FIG. 7 is a rear perspective view of an embodiment of the passenger support apparatus, showing the easy-entry unit in the occupant use position corresponding to FIG. 1.

FIG. 7 is a rear perspective view of an embodiment of the passenger support apparatus 10, including vehicle seat 12, seat support frame 14, and a cover assembly 34 coupled with the vehicle seat to limit access to the underside 30 of the seat bottom 16. Also shown diagrammatically in FIG. 7 is a control system 36 configured to control movement of various components of the passenger support apparatus 10. The depicted control system 36 includes an easy-entry motion controller 38, a seat-motion controller 40, and a controller link 42, each of which can be activated or deactivated. The easy-entry motion controller 38 is configured to block the easy-entry unit 28 from moving from the upright or occupant use position to the access or forward-tilted position when it is deactivated. The easy-entry motion controller 38 may be activated by a user pulling a handle, depressing a button or lever, or by some automated means (not shown). For example, the easy-entry motion controller 38 may include a latch or mechanism that engages and holds the rear portion 24 of the seat bottom 16 to the support frame 14 when deactivated and disengages the support frame when activated.

The seat-motion controller 40 is configured to block movement of the vehicle seat 12 between the rearward and forward positions when deactivated. The seat-motion controller 40 may be activated by the user pulling a handle, such as handle 44 of FIG. 7, depressing a button or lever, or by some automated means. For example, the seat-motion controller 40 may include a latch or mechanism that engages and holds the front portion 22 of the seat bottom 16 in place along the support frame 14 when deactivated and disengages to allow sliding movement along the support frame when activated. The seat-motion controller 40 may also be activated by the controller link 42 in some embodiments.

The controller link 42 connects and/or extends between the easy-entry motion controller 38 and the seat-motion controller 40. The controller link 42 may be configured to be activated and to transmit motion from the easy-entry motion controller 38 to the seat-motion controller 40 to activate the seat-motion controller in response to movement of the easy-entry unit 28 from the occupant use position to the access position.

In order to reconfigure the vehicle seat 12 from the occupant use position to the access position, a user may first activate the easy-entry motion controller 38 and cause or allow the easy-entry unit 28 to pivot about the pivot axis 26. Movement of the easy-entry unit 28 to the access position from the occupant use position activates the controller link 42 and, thereby, the seat-motion controller 40 so that vehicle seat 12 is free to slide along the seat support frame 14. Then, the user causes or allows the vehicle seat 12 to be moved forward from the rearward position to the forward position to assume a position such as that shown in FIG. 4, with increased access to the area behind the vehicle seat. When the vehicle seat 12 reaches the forward position, the seat-motion controller 40 is deactivated so that vehicle seat 12 is blocked from moving away from the forward position.

To move the vehicle seat 12 back to its original position, in which the easy-entry unit 28 is in the occupant use position and the seat is in the rearward position, the user first causes or allows the easy-entry unit 28 to pivot about pivot axis 26 from the access position to the occupant use position. When the easy-entry unit 28 reaches the occupant use position, the easy-entry motion controller 38 is deactivated and the seat-motion controller 40 is activated so that the easy-entry unit 28 is blocked from pivoting away from the occupant use position and the vehicle seat 12 is free to slide along the seat support frame 14. The user may then cause or allow the vehicle seat 12 to be moved in a direction toward the rear of the vehicle to the rearward position (e.g. the position shown in FIGS. 1 and 6). When the vehicle seat 12 reaches the rearward position, the seat-motion controller 40 is deactivated so that vehicle seat is blocked from sliding along the seat support frame 14.

As is apparent from FIGS. 1-6, as the vehicle seat 12 moves between various positions and configurations, the seat bottom 16, and in particular the rear portion 24 of the seat bottom, assumes various orientations as it pivots about the pivot axis 26. For example, when the easy-entry unit 28 is in the occupant use position, the underside 30 of the rear portion 24 of the seat bottom 16 faces down and toward the seat support frame 14 or the vehicle floor. When the easy entry-unit 28 pivots about the pivot axis 26 and tilts forward, the underside 30 moves away from the support frame 14 and at least partly faces toward the rear of the vehicle and the area behind the vehicle seat 12. The cover assembly 34, such as that shown in FIGS. 7-9, may be configured to limit access to the underside 30 of the seat bottom 16—in particular to the underside 30 of the rear portion 24 of the seat bottom. Further, the cover assembly 34 may be configured to limit access to the underside 30 of the seat bottom whether the vehicle seat 12 is in the occupant use position, in the access position, or in any intermediate position.

Figure 8:
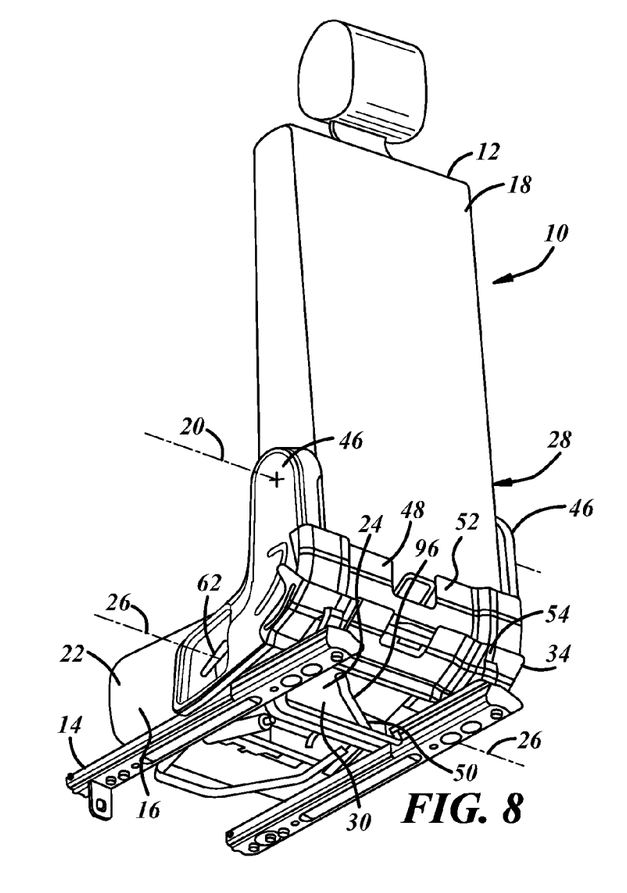
FIG. 8 is a rear perspective view of the passenger support apparatus of FIG. 7, showing the easy-entry unit in the intermediate position corresponding to FIG. 2.
Figure 9:
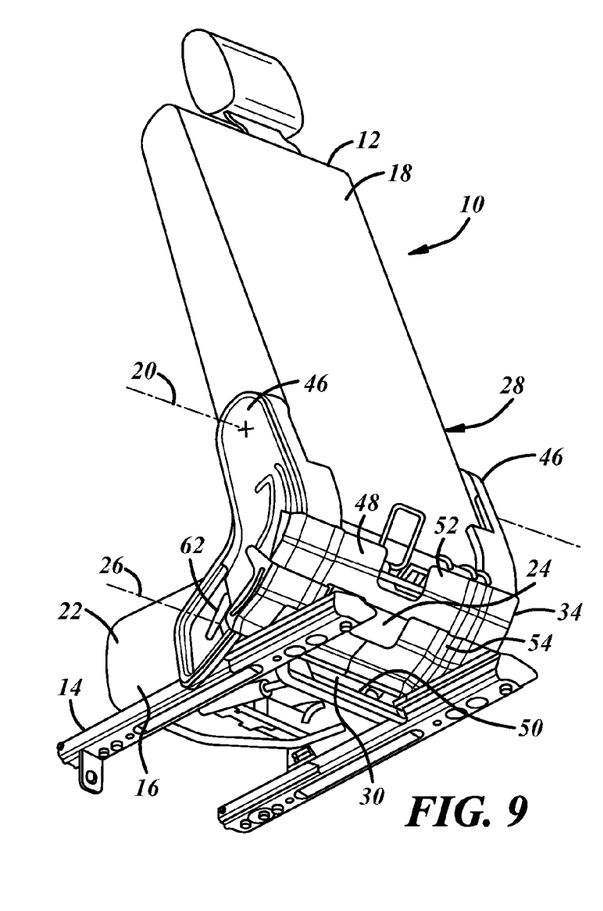
FIG. 9 is a rear perspective view of the passenger support apparatus of FIG. 7, showing the easy-entry unit in the access position corresponding to FIG. 3.

The cover assembly 34 illustrated in FIGS. 7-9 is configured to move or change from a stored configuration or position when the easy-entry unit 28 is in the occupant use position, to a deployed configuration or position when the easy-entry unit is in the access position. The cover assembly 34 may also be referred to as a foot guard-cover, as it helps prevent the foot of a passenger seated behind the vehicle seat 12 from reaching or accessing the underside 30 or interior of the seat bottom 16. Various other components, such as electronic components, electrical wiring, sensors, control system 36 components, etc., may be located at the underside 30 of the seat bottom, and the cover assembly 34 can help prevent a passenger from inadvertently jostling or damaging such components. The cover assembly 34 may also be useful to prevent cargo or debris inside the vehicle from becoming lodged beneath the seat 12, which could hinder operation and/or adjustability of the seat. The cover assembly 34 may also act as a safety device by preventing hands or feet of passengers seated behind the vehicle seat, or of passengers entering or exiting the area behind the vehicle seat, from reaching potential injury-causing components located at the underside 30 of the seat.

FIGS. 7-9 respectively show the easy-entry unit 28 in the occupant use position, an intermediate position, and the access position. The illustrative cover assembly 34 is also respectively shown in the stored position, an intermediate position, and the deployed position. The illustrative cover assembly 34 is coupled to the easy-entry unit 28 and is configured to expand and retract between the stored position and the deployed position in response to the easy-entry unit moving between the occupant use position and the access position. The cover assembly 34 also slides along with the vehicle seat 12 between the rearward position and the forward position along the seat support frame 14. When the vehicle seat 12 moves from the occupant use configuration to the access configuration, the cover assembly 34 expands from the stored position of FIG. 7 to the deployed position of FIG. 9 and remains coupled to the vehicle seat 12. When the vehicle seat 12 moves from the access configuration to the occupant use configuration, the cover assembly 34 retracts from the deployed position of FIG. 9 to the stored position of FIG. 7 and again remains coupled to the vehicle seat 12.

In the stored position of FIG. 7, the cover assembly 34 is configured to block anything from extending under the seat back 18 and into the rear portion 24 of the seat bottom 16 (e.g., the feet of a passenger seated in the third row seat). As the cover assembly 34 moves through the intermediate configuration of FIG. 8 and from the stored position to the deployed position, the cover assembly expands to block, for example, the feet of a passenger seated in the third row seat from extending into the rear portion 24 of the seat bottom 16 through the underside 30 or rear end 32 of the rear portion of the seat bottom. In the deployed position of FIG. 9, the cover assembly 34 is configured to block, for example, the feet of a passenger seated in the third row seat from extending into the rear portion 24 of the seat bottom 16 through the underside 30 of the rear portion of the seat bottom. Thus, the cover assembly 34 provides cover means for covering the otherwise exposed underside 30 of the seat bottom 16 to block passengers and items located behind the vehicle seat 12 from entering an interior region formed by the rear portion 24 of the seat bottom.

The cover assembly 34 illustrated in FIG. 7 includes shield guides 46, a shield 48, and a shield driver 50. One of the shield guides 46 is located on a first or right-hand side of the seat assembly 12, and another of the shield guides is located on an opposite second or left-hand side of the seat assembly. Each shield guide 46 is coupled to the rear portion 24 of the seat bottom 16 and is configured to guide the shield 48 along the rear portion of the seat bottom as the cover assembly 34 changes between the stored configuration and the deployed configuration.

As shown in FIGS. 8 and 9, the shield 48 in this example includes an inner shield plate 52 and an outer shield plate 54. Each of the plates 52, 54 moves along the rear portion 24 of the seat bottom 16 as the cover assembly 34 changes between the stored configuration to the deployed configuration. The shield driver 50 is coupled to the easy-entry unit 28 and to the outer shield plate 54 and is configured to move the inner shield plate 52 and the outer shield plate in response to the easy-entry unit 28 pivoting about the pivot axis 26.

The shield plates 52, 54 slide relative to the shield guides 46 and relative to each other as the cover assembly 34 changes between the stored configuration to the deployed configuration in response to the easy-entry unit 28 moving from the occupant use position to the access position. In the embodiment illustrated in FIGS. 7-9, the outer shield plate 54 slides relative to both the seat bottom 16 and the inner shield plate 52 when the easy-entry unit 28 moves from the occupant use position of FIG. 7 to the intermediate position of FIG. 8. Then, both the inner shield plate 52 and the outer shield plate 54 slide relative to the seat bottom 16 when the easy-entry unit 28 moves from the intermediate position of FIG. 8 to the access position of FIG. 9. When the illustrated cover assembly 34 is in the stored configuration, the inner and outer shield plates 52, 54 overlap each other so that the outer plate overlies the inner plate, as shown in FIG. 7, where the inner shield plate is not visible. When the cover assembly 34 is in the deployed position, the inner shield plate 52 is substantially slid out from beneath the outer shield plate 54, as shown in FIG. 9. In this example, the cover assembly 34 may be described as having a telescoping configuration in which the plates 52, 54 slide relative to each other to cover a larger portion of the easy-entry unit 28 when in the deployed configuration than when in the stored configuration.

Figure 10:
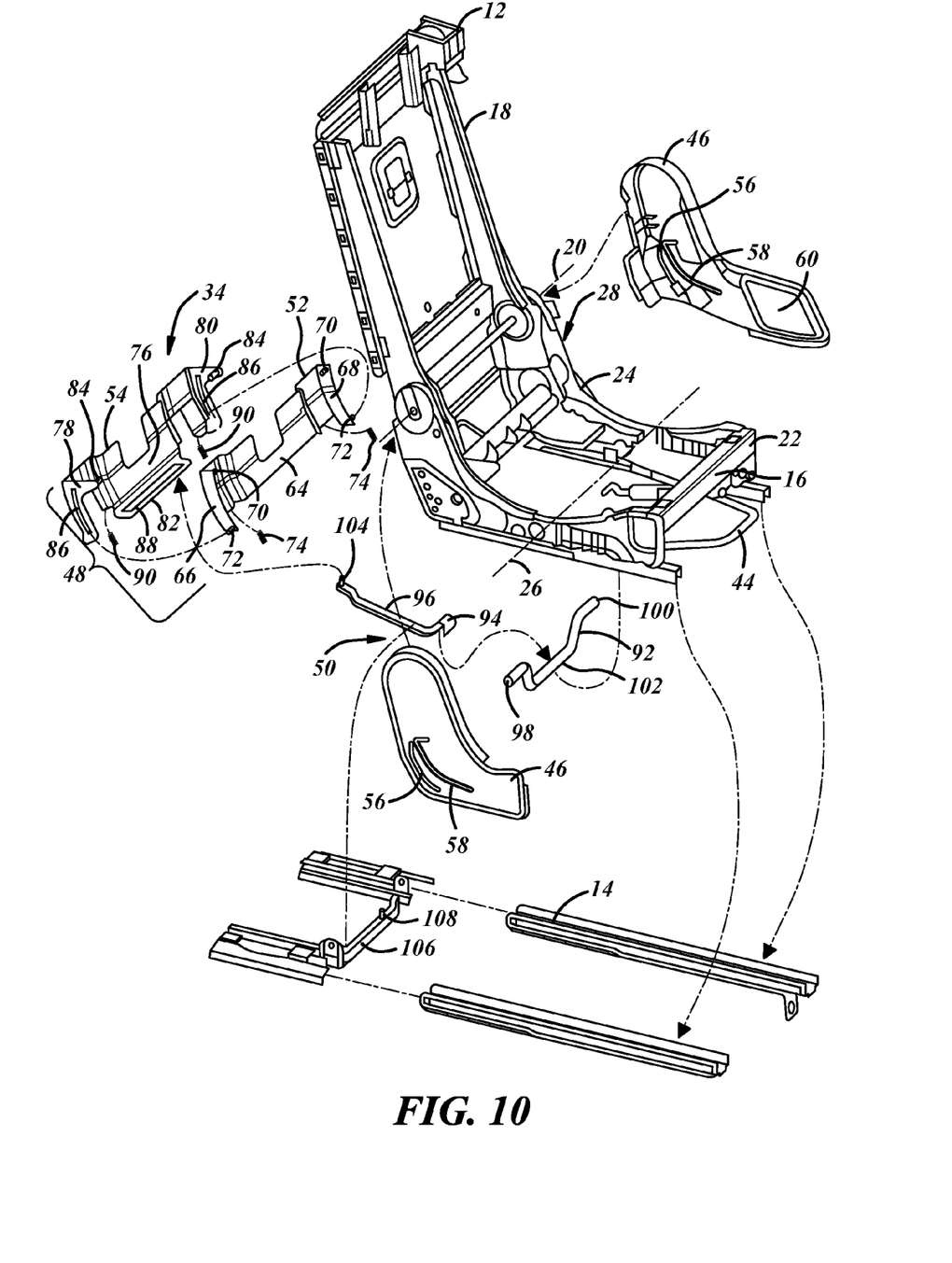
FIG. 10 is an exploded view of the passenger support apparatus of FIGS. 7-9.

Referring now to FIG. 10, the passenger support apparatus 10 is shown in an exploded view with portions such as decorative coverings and cushions removed to reveal the underlying seat structure. Each shield guide 46 is coupled to a side of the rear portion 24 of the seat bottom 16. Each shield guide 46 is formed to include an inner pin slot 56 and an outer pin slot 58. The inner pin slots 56 guide the motion of the inner shield plate 52 as it moves along the shield guides 46. The outer pin slots 58 guide the motion of the outer shield plate 54 as it moves along the shield guides 46. One or both of the shield guides 46 may include a control opening 60 sized to allow a user to access the a handle, lever, or other component (e.g. handle 62 of FIGS. 7-9) situated along a side of the seat bottom 16.

The inner shield plate 52 in this embodiment includes a main wall 64 extending the width of the seat bottom 16, a first side wall 66, and a second side wall 68. The first side wall 66 and the second side wall 68 extend substantially perpendicularly from opposite ends of the main wall 64. The side walls 66, 68 are each formed to include an inwardly extending pin 70 configured to be received by the inner pin slots 56 of the shield guides 46, as well as an outwardly extending pin 72 configured to be received by the outer shield plate 54. The inner shield plate 52 is coupled to the rear portion 24 of the seat bottom 16 by a pair of springs 74 that bias the inner shield plate 52 away from movement with the outer shield plate 54 during movement of the cover assembly 34 from the stored configuration toward the deployed configuration.

The outer shield plate 54 in this embodiment includes a main wall 76 extending the width of the inner shield plate 52, a first side wall 78, a second side wall 80, and a bottom wall 82. The first side wall 78 and the second side wall 80 extend substantially perpendicularly from opposite ends of the main wall 76. The side walls 78, 80 are each formed to include an inwardly extending pin 84 and a plate guide slot 86. The plate guide slots 86 are configured to receive the outwardly extending pins 72 of the inner shield plate 52 so that the outer shield plate 54 is guided relative to the inner shield plate and pulls the inner shield plate when the inner shield plate moves relative to the shield guides 46. The bottom wall 82 of the outer shield plate 54 extends substantially perpendicularly from the bottom side of the main wall 76 and is formed to include a drive slot 88 extending along the length of the main wall. The outer shield plate 54 is coupled to the inner shield plate 52 by a pair of springs 90 so that the outer shield plate and the inner shield plate move together during movement of the cover assembly from the deployed configuration to the stored configuration.

Figure 11:
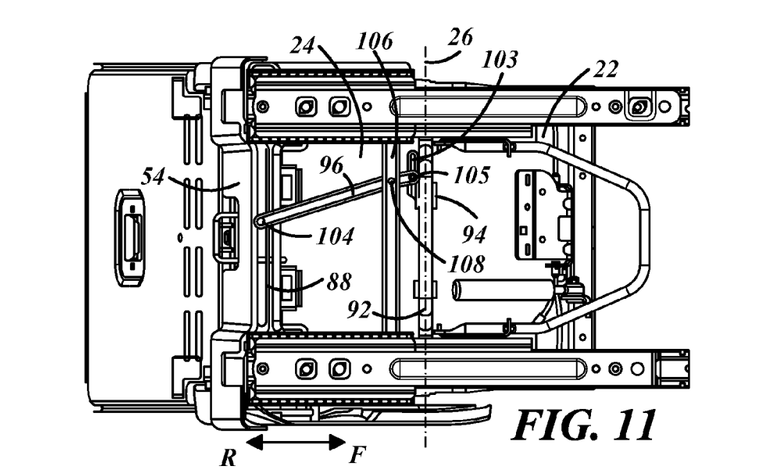
FIG. 11 is a bottom view of the passenger support apparatus of FIG. 10, showing an illustrative configuration for a shield driver.

The illustrated shield driver 50 includes a drive rod 92, a slide coupler 94, and a pivot link 96, and is shown in greater detail in FIG. 11, which shows a bottom view of the vehicle seat. Reference is made here to both of FIGS. 10 and 11, and not all components are labeled in both figures. The drive rod 92 includes opposite first and second ends 98, 100 and an offset portion 102 located therebetween. The ends 98, 100 of the drive rod 92 are coupled to the rear portion 24 of the seat bottom 16 along the pivot axis 26 so that the drive rod 92 pivots with the easy-entry unit 28 about the pivot axis 26. The offset portion 102 of the drive rod 92 is offset from the pivot axis 26. The slide coupler 94 is coupled to the offset portion 102 of the drive rod 92 so that the slide coupler is rotatable about the lengthwise axis of the offset portion, which in this case is parallel to the pivot axis 26. The slide coupler 94 is formed to include a coupler slot 103 (see FIG. 11) to receive the pivot link 96. The pivot link 96 includes a coupler pin 105 (see FIG. 11) at one end that is received by the coupler slot 103 of the slide coupler 94, and a drive pin 104 at an opposite end that is received by the drive slot 88 of the outer shield plate 54. The pivot link 96 is pivotally coupled to a brace 106—included as part of the seat support frame—at a location between the coupler pin and the drive pin 104 by another pin 108.

In operation, the pivot link 96 of the shield driver 50 moves between an extended position (as shown in FIGS. 7 and 11) and a collapsed position (as in FIG. 9, where the pivot link cannot be seen) and through an intermediate position (as shown in FIG. 8). The pivot link 96 is moved to the extended position, pushing the shield 48 of the cover assembly 34 into the stored configuration, when the easy-entry unit 28 is in the occupant use position. In the extended position, the pivot link 96 may be substantially perpendicular to the drive rod 92—i.e., oriented with its opposite ends generally arranged along the front-to-rear direction of the vehicle. The pivot link 96 is moved to the collapsed position, pulling the shield 48 of the cover assembly 34 into the deployed position, when the easy-entry unit 28 is in the access position. In the collapsed position, the pivot link 96 may be substantially parallel to the drive rod 92 or brace 106—i.e., oriented with its opposite ends arranged along the side-to-side or transverse direction of the vehicle.

Figure 12:
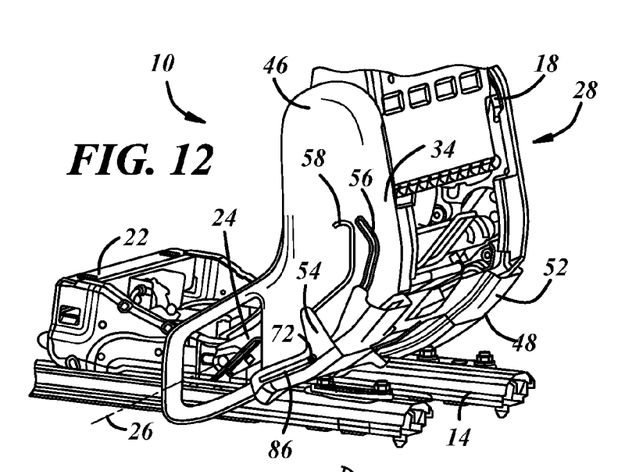
FIG. 12 is an enlarged view of a portion of the passenger support apparatus of FIG. 9 with additional detail.
Figure 13:
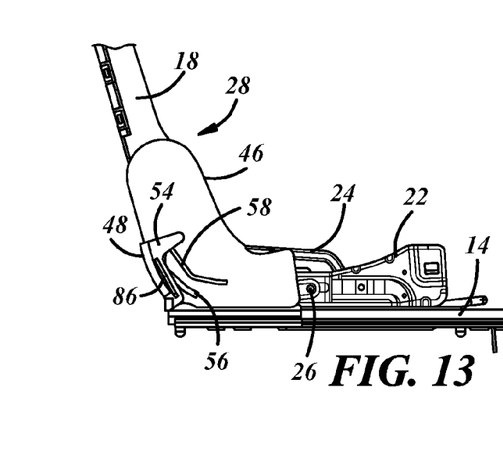
FIG. 13 is a side view of a portion of the passenger support apparatus of FIG. 10 with the easy-entry unit in the occupant use position and the cover assembly in the stored configuration.
Figure 14:
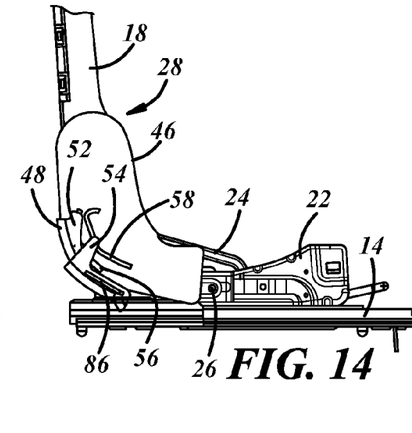
FIG. 14 is the side view of FIG. 13 showing the easy-entry unit and the cover assembly in an intermediate position.
Figure 15:
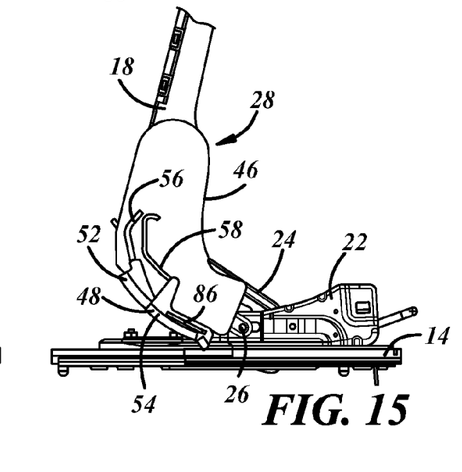
FIG. 15 is the side view of FIG. 13 showing the easy-entry unit in the access position and the cover assembly in the deployed configuration.

FIG. 12 shows an enlarged view of a portion of the passenger support apparatus 10 of FIGS. 7-11 with the easy-entry unit 28 in the access position so that the cover assembly 34 is in the deployed configuration. The inner shield plate 52 is shown slid out from beneath the outer shield plate 54. The inner shield plate 52 is guided to and from the illustrated position by the inner pin slot 56, and the outer shield plate 54 is guided to and from the illustrate position by the outer pin slot 58. Pins 72 of the inner shield plate 52 cooperate with slots 86 of the outer shield plate 54 to guide the plates relative to each other. FIGS. 13-15 are side views of a portion of the same passenger support apparatus showing the easy-entry unit 28 in respective occupant use, intermediate, and access positions. In FIGS. 13 and 14, the vehicle seat is shown in the rearward position and in FIG. 15 is shown in the forward position. Various components are labeled consistent with the other figures for reference.

Figure 16:
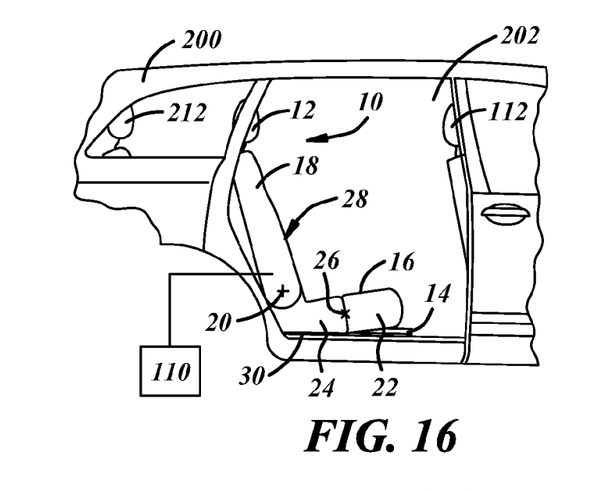
FIG. 16 is a side view of an embodiment of a passenger support apparatus, including a vehicle seat equipped with an easy-entry unit and having a seat back pivotally coupled with a seat bottom of the vehicle seat.
Figure 17:
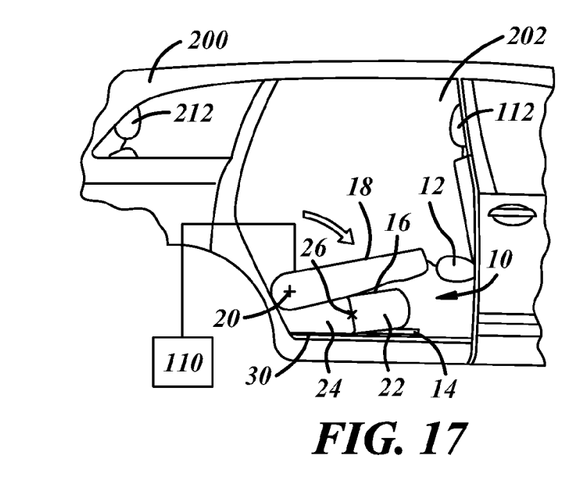
FIG. 17 is a side view of the passenger support apparatus of FIG. 16, showing the seat back in a table-top position.

In some embodiments, the seat back 18 is movable between a back-support position and a table-top position as shown respectively in FIGS. 16 and 17. In the back-support position of FIG. 16, the seat back 18 extends up from the rear portion 24 of the seat bottom 16 to provide back support for a passenger seated on the vehicle seat 12. In the table-top position of FIG. 17, the seat back 18 is arranged to lie over the front and rear portions 22, 24 of the seat bottom 16 and is substantially parallel to the seat bottom so that the seat back 18 provides a generally horizontal surface that can support cargo or other articles, for example.

Figure 18:
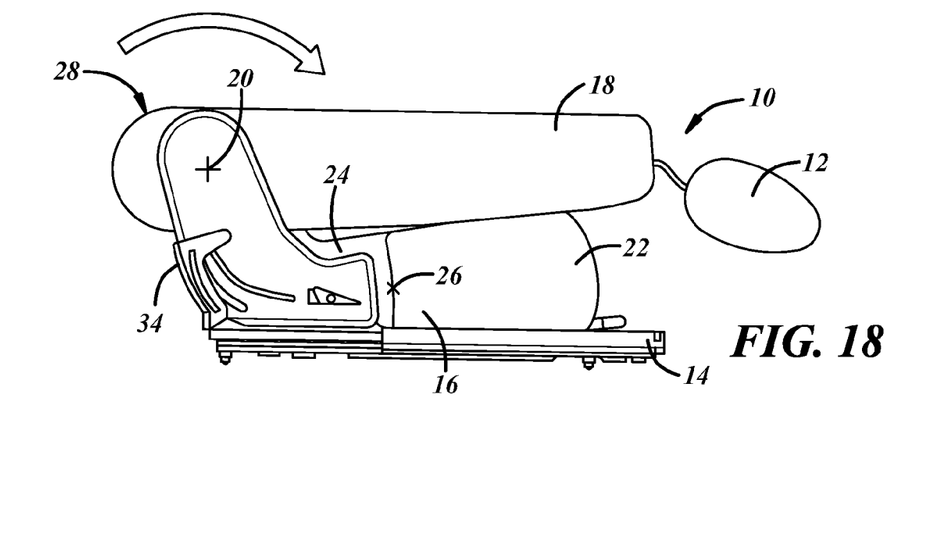
FIG. 18 is an enlarged side view of the passenger support apparatus of FIG. 17, showing additional detail.

To move the seat back 18 from the back-support position to the table-top position, a user may first activate a seat back motion controller 110, shown diagramatically in FIGS. 16 and 17, by pulling or moving a handle or lever (e.g. handle 62 of FIGS. 7-9). Then the user may cause or allow the seat back 18 to pivot about the pivot axis 20 as suggested in FIG. 18 so that the seat back 18 is substantially parallel to the seat bottom 16 and extends over both the front and rear portions 22, 24 of the seat bottom. The seat back motion controller 110 moves between a deactivated position, in which the seat back 18 is blocked from pivoting about pivot axis 20, and an activated position, in which the seat back 18 is free to pivot about the pivot axis 20. The seat-back motion controller 110 is biased to the deactivated position when the seat back 18 is in the back-support position. When the seat back 18 is moved away from the back-support position, the seat-back motion controller 110 is biased to the activated position.

As will be appreciated in view of the above description, the disclosed passenger support apparatus, including the vehicle seat 12 and cover assembly 34, may be incorporated into other vehicles in any row of seating and into vehicles without multiple rows of seats. For instance, in a vehicle having only two doors, a passenger support apparatus as described herein may be desirable for accessing space behind the first row seat(s). In another example, a vehicle having standard front doors and rear-pivoted rear doors (i.e., "suicide doors") may benefit from incorporating the passenger support apparatus described here. Likewise, vehicles with many other combinations of doors and seats may benefit from the teachings presented herein.

It is to be understood that the foregoing is a description of one or more preferred exemplary embodiments of the invention. The invention is not limited to the particular embodiment(s) disclosed herein, but rather is defined solely by the claims below. Furthermore, the statements contained in the foregoing description relate to particular embodiments and are not to be construed as limitations on the scope of the invention or on the definition of terms used in the claims, except where a term or phrase is expressly defined above. Various other embodiments and various changes and modifications to the disclosed embodiment(s) will become apparent to those skilled in the art. All such other embodiments, changes, and modifications are intended to come within the scope of the appended claims.

As used in this specification and claims, the terms "for example," "for instance," "such as," and "like," and the verbs "comprising," "having," "including," and their other verb forms, when used in conjunction with a listing of one or more components or other items, are each to be construed as open-ended, meaning that the listing is not to be considered as excluding other, additional components or items. Other terms are to be construed using their broadest reasonable meaning unless they are used in a context that requires a different interpretation.

The invention claimed is:

1. A passenger support apparatus, comprising:
   a seat support frame;
   a vehicle seat coupled to and overlying the seat support frame, the vehicle seat including a seat bottom and a seat back extending from the seat bottom, the seat bottom having a front portion and a rear portion pivotally coupled with the front portion for rotation about a pivot axis; and
   a cover assembly coupled to the seat bottom that limits access to an underside of the seat bottom, wherein the seat back and the rear portion of the seat bottom cooperate to form an easy-entry unit that pivots about the pivot axis between an occupant use position and an access position, and
   wherein the cover assembly changes from a stored configuration to a deployed configuration in response to movement of the easy-entry unit from the occupant use position to the access position, the cover assembly covering at least a portion of the underside of the seat bottom when in the deployed position.

2. A passenger support apparatus as defined in claim 1, wherein the cover assembly includes a shield guide coupled to the seat bottom and a shield that is movable along a path at least partially defined by the shield guide.

3. A passenger support apparatus as defined in claim 2, wherein the cover assembly includes a shield driver coupled to the shield and configured to drive the shield along said path in response to movement of the easy-entry unit between the occupant use position and the access position.

4. A passenger support apparatus as defined in claim 3, wherein the shield driver includes a drive rod, a slide coupler pivotally coupled to the drive rod, and a pivot link extending between the slide coupler and the shield.

5. A passenger support apparatus as defined in claim 4, wherein the pivot link is: pivotally coupled to the seat-support frame, slidably coupled to the shield, slidably coupled to the slide coupler, or any combination thereof.

6. A passenger support apparatus as defined in claim 1, wherein the cover assembly includes an inner shield plate and an outer shield plate in sliding arrangement with each other, so that at least a portion of the inner shield plate slides out from beneath the outer shield plate when the easy-entry unit is moved from the occupant use position to the access position.

7. A passenger support apparatus as defined in claim 1, wherein the seat back is pivotally coupled with the rear portion of the seat bottom for rotation about a second pivot axis.

8. A passenger support apparatus, comprising:
   a seat support frame;
   a vehicle seat coupled to and overlying the seat support frame, the vehicle seat including a seat bottom and a seat back extending from the seat bottom, the seat bottom having a front portion and a rear portion pivotally coupled with the front portion for rotation about a pivot axis; and
   a cover assembly coupled to the seat bottom that limits access to an underside of the seat bottom, wherein the seat back and the rear portion of the seat bottom cooperate to form an easy-entry unit that pivots about the pivot axis between an occupant use position and an access position, and
   wherein the cover assembly includes a shield guide coupled to the seat bottom and a shield that is movable along a path at least partially defined by the shield guide.

9. A passenger support apparatus as defined in claim 8, wherein the cover assembly includes a shield driver coupled to the shield and configured to drive the shield along said path in response to movement of the easy-entry unit between the occupant use position and the access position.

10. A passenger support apparatus as defined in claim 9, wherein the shield driver includes a drive rod, a slide coupler pivotally coupled to the drive rod, and a pivot link extending between the slide coupler and the shield.

11. A passenger support apparatus as defined in claim 10, wherein the pivot link is: pivotally coupled to the seat-support frame, slidably coupled to the shield, slidably coupled to the slide coupler, or any combination thereof.

12. A passenger support apparatus as defined in claim 8, wherein the cover assembly includes an inner shield plate and an outer shield plate in sliding arrangement with each other, so that at least a portion of the inner shield plate slides out from beneath the outer shield plate when the easy-entry unit is moved from the occupant use position to the access position.

13. A passenger support apparatus as defined in claim 8, wherein the seat back is pivotally coupled with the rear portion of the seat bottom for rotation about a second pivot axis.

14. A passenger support apparatus, comprising:
   a seat support frame;
   a vehicle seat coupled to and overlying the seat support frame, the vehicle seat including a seat bottom and a seat back extending from the seat bottom, the seat bottom having a front portion and a rear portion pivotally coupled with the front portion for rotation about a pivot axis; and
   a cover assembly coupled to the seat bottom that limits access to an underside of the seat bottom, wherein the seat back and the rear portion of the seat bottom cooperate to form an easy-entry unit that pivots about the pivot axis between an occupant use position and an access position,
   wherein the cover assembly includes an inner shield plate and an outer shield plate in sliding arrangement with each other, so that at least a portion of the inner shield plate slides out from beneath the outer shield plate when the easy-entry unit is moved from the occupant use position to the access position.

15. A passenger support apparatus as defined in claim 14, wherein the cover assembly includes a shield driver coupled to a shield that includes the inner and outer shield plates, the shield driver being configured to drive the shield along a path in response to movement of the easy-entry unit between the occupant use position and the access position.

16. A passenger support apparatus as defined in claim 15, wherein the shield driver includes a drive rod, a slide coupler pivotally coupled to the drive rod, and a pivot link extending between the slide coupler and the shield.

17. A passenger support apparatus as defined in claim 16, wherein the pivot link is: pivotally coupled to the seat-support frame, slidably coupled to the shield, slidably coupled to the slide coupler, or any combination thereof.

18. A passenger support apparatus as defined in claim 14, wherein the seat back is pivotally coupled with the rear portion of the seat bottom for rotation about a second pivot axis.

* * * * *